United States Patent
Kalaboukis (10) Patent No.: US 9,762,861 B2
(45) Date of Patent: Sep. 12, 2017

(54) TELEPRESENCE VIA WIRELESS STREAMING MULTICAST

(75) Inventor: Chris Kalaboukis, Los Gatos, CA (US)

(73) Assignee: EXCALIBUR IP, LLC, New York, NY (US)

(*) Notice: Subject to any disclaimer, the term of this patent is extended or adjusted under 35 U.S.C. 154(b) by 1724 days.

(21) Appl. No.: 11/566,916

(22) Filed: Dec. 5, 2006

(65) Prior Publication Data

US 2008/0134235 A1    Jun. 5, 2008

(51) Int. Cl.
| | |
|---|---|
| G06F 15/16 | (2006.01) |
| H04N 7/173 | (2011.01) |
| H04N 5/76 | (2006.01) |
| H04N 21/2743 | (2011.01) |
| H04N 21/414 | (2011.01) |
| H04N 21/4223 | (2011.01) |
| H04N 21/462 | (2011.01) |
| H04N 21/4788 | (2011.01) |
| H04N 21/61 | (2011.01) |
| H04N 21/6405 | (2011.01) |
| H04N 21/81 | (2011.01) |
| H04N 5/77 | (2006.01) |

(52) U.S. Cl.
CPC .......... H04N 7/17318 (2013.01); H04N 5/76 (2013.01); H04N 21/2743 (2013.01); H04N 21/41407 (2013.01); H04N 21/4223 (2013.01); H04N 21/4622 (2013.01); H04N 21/4788 (2013.01); H04N 21/6125 (2013.01); H04N 21/6405 (2013.01); H04N 21/812 (2013.01); H04N 5/77 (2013.01)

(58) Field of Classification Search
CPC ......... H04N 21/2743; H04N 21/41407; H04N 21/6125

USPC .................. 709/227, 206; 724/32
See application file for complete search history.

(56) References Cited

U.S. PATENT DOCUMENTS

| | | | | |
|---|---|---|---|---|
| 8,223,186 | B2 * | 7/2012 | Derocher et al. | 348/14.01 |
| 2005/0033615 | A1 * | 2/2005 | Nguyen et al. | 705/5 |
| 2005/0060411 | A1 * | 3/2005 | Coulombe et al. | 709/227 |
| 2006/0067287 | A1 * | 3/2006 | Kim et al. | 370/338 |
| 2006/0271687 | A1 * | 11/2006 | Alston et al. | 709/227 |
| 2007/0100690 | A1 * | 5/2007 | Hopkins | 705/14 |
| 2007/0180135 | A1 * | 8/2007 | Kenrick et al. | 709/231 |

(Continued)

OTHER PUBLICATIONS

Urgaonkar et al. Dynamic Provisioning of Multi-tier Internet Applications. Jun. 2005.*

*Primary Examiner* — Bryan Lee
(74) *Attorney, Agent, or Firm* — James J. DeCarlo; Greenberg Traurig, LLP (57) ABSTRACT

A method is disclosed which provides for multicasting video of an event, thereby allowing geographically dispersed members of a user's social network to experience a user's current locale, so that the user's friends may join him via live video at events (concerts, clubs, or other venues) which they cannot attend in person. The method includes the steps of enabling transmission of an invitation to at least one selected individual; processing an acceptance of the invitation; processing a live video signal of the event; storing the signal in a streaming database; and outputting a video stream in accordance with the acceptance. The outputting may be performed in real time. The processing of the live video signal may also include caching the video signal, so that the event may be viewed other than in real time.

30 Claims, 6 Drawing Sheets

(56) References Cited

U.S. PATENT DOCUMENTS

| | | | | |
|---|---|---|---|---|
| 2007/0276917 A1* | 11/2007 | Sandegard et al. | ............ | 709/214 |
| 2008/0092199 A1* | 4/2008 | McCarthy et al. | ............ | 725/133 |
| 2008/0098446 A1* | 4/2008 | Seckin et al. | ................. | 725/114 |
| 2008/0209486 A1* | 8/2008 | Casaos | ........................... | 725/109 |
| 2008/0231684 A1* | 9/2008 | Underwood et al. | ...... | 348/14.01 |
| 2009/0019374 A1* | 1/2009 | Logan et al. | ................. | 715/753 |
| 2009/0201835 A1* | 8/2009 | Balakrishnan et al. | ...... | 370/261 |
| 2012/0311163 A1* | 12/2012 | Sollee | ........................... | 709/227 |

* cited by examiner

TELEPRESENCE VIA WIRELESS STREAMING MULTICAST

TECHNICAL FIELD

The present disclosure relates to wireless communications, and more particularly to multicasting live images as streaming video to selected persons by a user.

BACKGROUND OF THE DISCLOSURE

One frequently wishes to share a particular, immediate experience with another person who is not physically close by. For example, an individual attending an event, such as an outdoor concert, may want several of his friends (all of them geographically dispersed) to see what he is seeing at that moment.

Many wireless telephones now have the capability to record video images, functioning either as a camera or camcorder, or having a camcorder attachment. Presently available systems permit a user of a telephone camera/camcorder to post completed photos or videos to an Internet location for viewing by others. For example, a telephone camera/camcorder may be used to record an event (producing still or video images), with the recording subsequently posted on a Web site using an Internet based video or photo sharing service such as FLICKR® or YouTube®. Using these approaches, events can be recorded and played back at a later time, but they cannot be both experienced and shared in real time.

SUMMARY OF THE DISCLOSURE

It therefore is desirable to provide a system and method for sharing a real time event with one's social network. Such a system preferably would permit an individual to present live video to selected remote users, and simultaneously allow all the users to discuss the event over an audio connection.

A method is disclosed which provides for multicasting video of an event, thereby allowing geographically dispersed members of a user's social network to experience a user's current locale, so that the user's friends may join him via a live video at events (concerts, clubs, or other venues) which they cannot attend in person. The method includes the steps of enabling transmission of an invitation to at least one selected individual; processing an acceptance of the invitation; processing a live video signal of the event; storing the signal in a streaming database; and outputting a video stream in accordance with the acceptance. The outputting may be performed in real time. The processing of the live video signal may also include caching the video signal, so that the event may be viewed other than in real time.

In an embodiment, the processing of the acceptance further includes detecting capabilities of a receiving device of the individual, so that the outputting of the video stream is performed in accordance with those capabilities.

In a further embodiment, the invitation includes information regarding the event, and the outputting of the video stream includes adding advertising content to the video stream in accordance with that information.

According to another aspect of the disclosure, a system for facilitating sharing of an experience by a viewer of an event includes a first server for enabling transmission of an invitation from the viewer to at least one selected individual and for processing an acceptance of the invitation; a second server for processing a live video signal of the event; and a third server for outputting a video stream to the selected individual in accordance with the acceptance.

According to a further aspect of the disclosure, a computer program product is provided which includes instructions executable by a computing device for performing the method described above. The computer program product, performing the method described herein, is realized as a software application called JoinMe, which may be invoked from a user's wireless camcorder telephone.

BRIEF DESCRIPTION OF THE DRAWINGS

The accompanying drawings, which are included to provide a further understanding of the disclosure and are incorporated in and constitute a part of this specification, illustrate various embodiments and together with the description serve to explain the principles of the disclosure.

DETAILED DESCRIPTION OF PREFERRED EMBODIMENTS

Figure 1A:
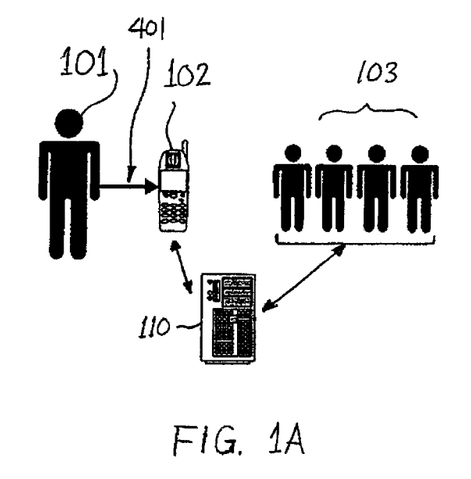
FIGS. 1A-1C schematically illustrates the flow of information and images in a system according to the disclosure.
Figure 1B:
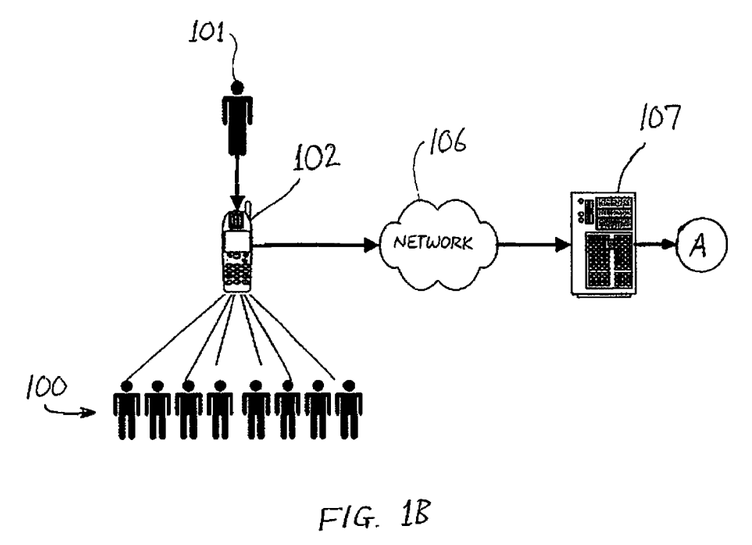
Figure 1C:
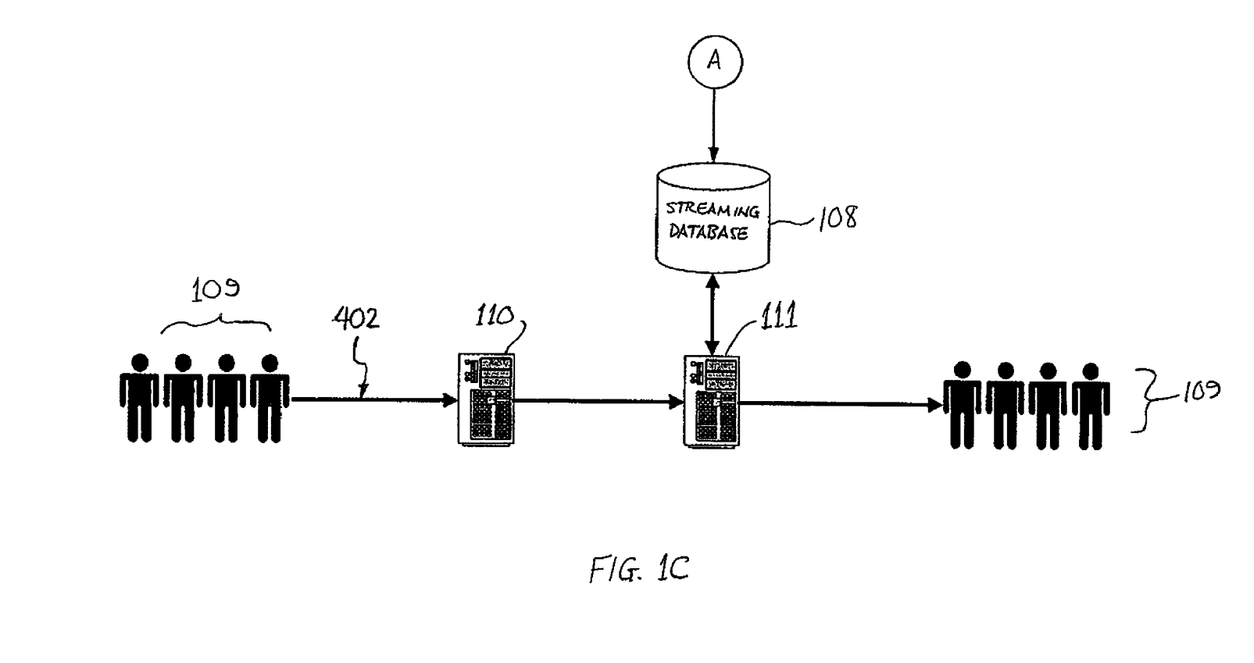
Figure 2:
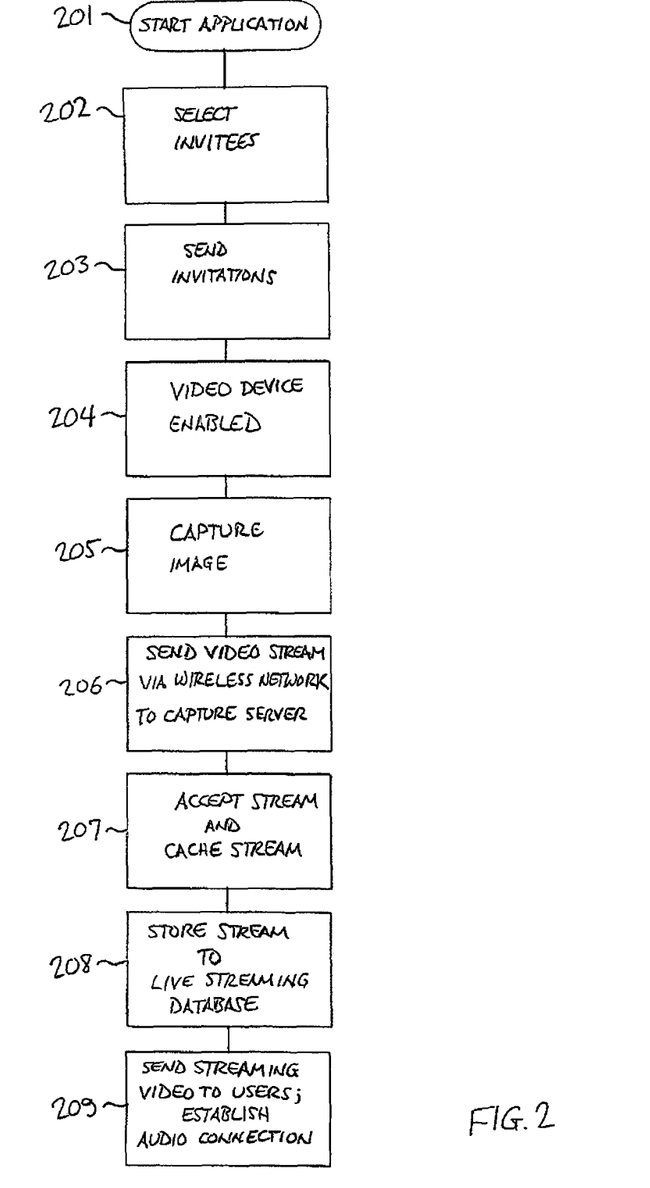
FIG. 2 is a flowchart illustrating steps in a method in accordance with the disclosure.

FIGS. 1A-1C schematically illustrate an embodiment of the disclosure in which a user 101 is attending an event 100, and wishes to share live images of the event with a number of other persons who are located elsewhere. FIG. 2 correspondingly shows steps in a method which is followed when the system of this embodiment is used.

In the following description it will be assumed that user 101 has a wireless telephone 102 that is capable of functioning as a camcorder to capture and record live video images. It will be appreciated, however, that this example is not limiting, and that the systems and methods of the present disclosure are applicable to a variety of any known or to become known portable electronic devices capable of capturing audio, video and/or images, as well as communicating wirelessly with other devices, networks, and/or the Internet. A "live" video image of an event is understood to refer to an image available to a person operating a remote device at or nearly at the time the event itself transpires (taking into account, by way of non-limiting example, brief time periods required for transmitting, buffering, caching and/or storing a signal representing the event).

In an embodiment, user 101 starts the JoinMe application on his telephone camcorder device 102, as shown in FIG. 1A (flowchart, step 201). As understood by those skilled in the art, the JoinMe software application itself is locally executable or available from a remote server, not shown, having a wireless connection to device 102. The user enters identifying information 401 for the video stream he is about to create (e.g. the name and/or date of the event). He then decides which people to invite to join him; that is, who he wishes to be recipients of the live video (step 202). The group of invitees 103 may optionally be individually selected persons; members of a predetermined group with a single group identifier; or a default group to whom an invitation is sent automatically with no real-time input from user 101 required. Device 102 is linked to an interaction server 110 which handles transmission of invitations and responses thereto. The invitation is sent to members of group 103 (step 203). Some or all of the invitees may accept the invitation, thereby becoming a group of recipients 109 (see FIG. 1C). The acceptances are sent as signals to interaction server 110; it is not necessary that they be audio or text messages directed to user 101, nor is it necessary for user 101 to respond to them.

As soon as at least one of the invitees responds with an acceptance, interaction server 110 sends a signal to device 102, enabling device 102 for capturing video images, and notifying user 101 that he may begin transmitting (step 204). The device displays a message to user 101 such as, for example, "Ready", "Start Transmitting?", etc. The display on device 102 may also show which invitees have already accepted.

User 101 then captures images of the event 100 with device 102, as shown in FIG. 1B (step 205). The device is connected to a wireless network 106 for transmitting a streaming video signal to a central media capture server 107 (step 206). Server 107 accepts and caches the video stream (step 207) and causes it to be saved in a live streaming database 108, as shown in FIG. 1C (step 208).

Individuals in the invitee group 103 may share the event with user 101 (that is, join group 109) by accepting the invitation either before or during the live image capture. In an embodiment, user 101 may set up a link associated with his own entry in his various friends' telephone address books. An invitee, reviewing his address book (which has an entry for his friend, user 101) and noticing that his friend has enabled the JoinMe application, may select that link at any time and be instantly connected with the video stream from the camcorder of user 101. Since the stream is cached, an invitee accepting the invitation after the live image capture has begun may be given the option of joining the live event in progress, or viewing the event from the beginning.

A response to an invitation, sent by a person joining group 109, includes a signal to server 110 which includes information 402 regarding the properties of that person's device. The interaction server signals a media server 111 to retrieve the stored video and begin a streaming session (step 209). Media server 111 (e.g. Darwin Streaming Server, an open source tool available from Apple®) thereupon sends the streaming video to the various devices 112 of members of group 109. The video may be formatted, for example, according to the 3GP standard, and transmitted according to the RTSP open standard streaming protocol, although any video/audio transmission protocols or techniques now known or to become known may be used to implement the transmission of sound or images as described herein.

The interaction server also instructs the media server regarding the device capabilities of the various recipients, so that each user may receive a streaming video signal in a convenient format. For example, if one recipient is viewing the video stream on a less powerful wireless telephone, the media server 111 will format the video accordingly (reduce resolution or "dumb down" the signal); if another recipient is using a more powerful desktop computer, the media server will attempt to enhance the signal (increase resolution) for that device.

In an embodiment, an audio connection is also established among all of the sharing parties (user 101 and members of group 109) so that they may discuss the shared event while they are viewing it. Both the video streaming session and the audio connection may continue until user 101 terminates the JoinMe application. Other communication methods are also possible, such as using text messaging, SMS, instant messaging or "walkie-talkie" type functionality to permit a more intimate shared experience.

In another embodiment, user 101 may choose to not send any invitations, but rather record event 100 for his own use. In this case the JoinMe application enables user 101 to employ the built-in memory of device 102 as a buffer for the video signal, and then to write the signal to server 107 over wireless network 106 (e.g. over the Internet). User 101 may then retrieve the video recording from server 111 at some later time.

In a further embodiment, user 101 may choose to have the JoinMe application running at all times, thereby maintaining an open video channel over which a continuous video signal is transmitted to his social network. In this embodiment (which may be characterized as "Open Channel"), a continuous video stream is available to all persons in the user's social network (that is, members of group 103) so that sending and responding to invitations may not be necessary. The JoinMe application may instead send an automatic notice to each member of group 103 that a video signal is available for viewing by any member of the group.

Figure 3A:
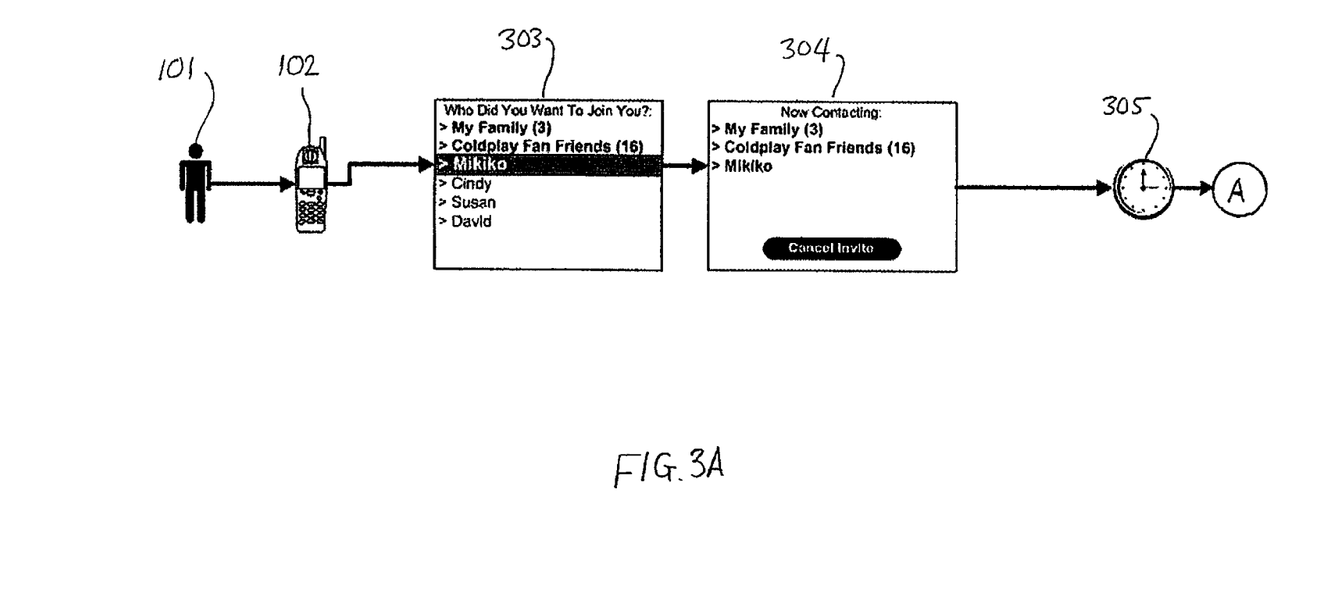
FIGS. 3A and 3B shows examples of screen displays and images seen by persons using the system of FIGS. 1A-1C.
Figure 3B:
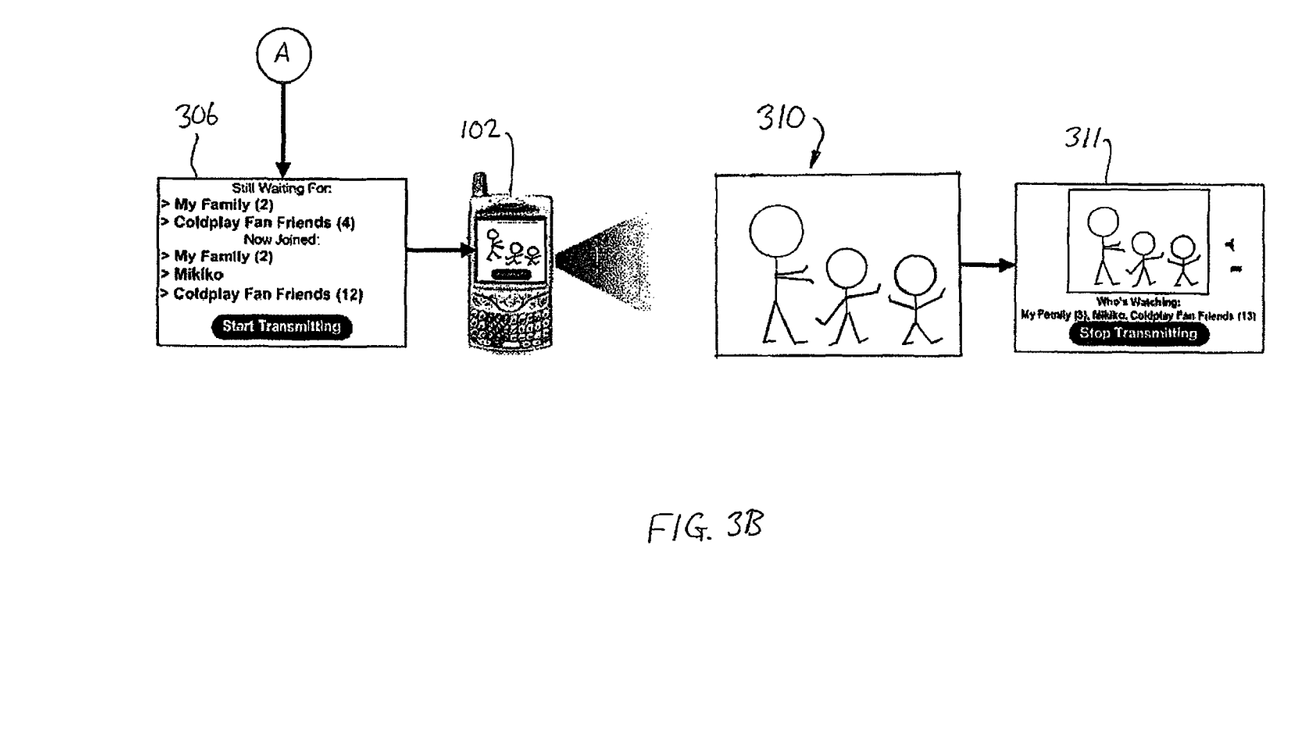

FIGS. 3A and 3B show examples of screen displays on device 102 of user 101 while running the JoinMe application. When user 101 starts the application, the screen displays a list 303 of possible invitees (that is, members of group 103), as shown in FIG. 3A. After user 101 has made his selection of whom to invite, the screen display 304 shows the progress of contacting the invitees. (Alternatively, an "Open Channel" selection may be provided; if user 101 makes this selection, no invitations are required and all persons on the list will be able to view a continuous video stream.) A period of time, shown schematically as 305, generally elapses while the invitees make their responses. As soon as any of the invitees accepts, the application causes screen 306 to be displayed, showing who has and has not yet responded and enabling live video transmission (FIG. 3B). User 101 may begin transmitting a live video signal by selecting "Start Transmitting." User 101 then aims or points device 102 toward the intended scene to capture image 310. As the image is transmitted to the group of recipients 109, device 102 displays screen 311, showing the image being transmitted and identifying who is watching. This display changes as viewers join or leave the group. User 101 may terminate the transmission by selecting "Stop Transmitting."

Figure 4:
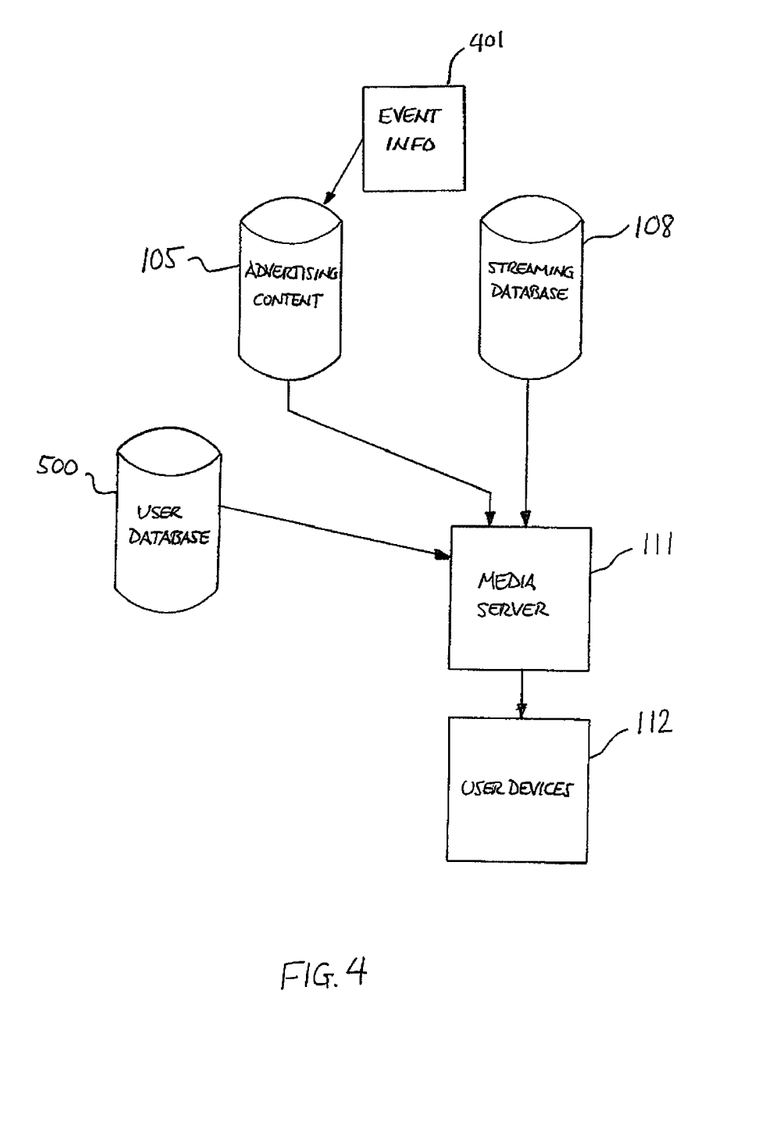
FIG. 4 schematically illustrates the addition of advertising content to live streaming video, in accordance with another embodiment.

FIG. 4 schematically illustrates a further embodiment in which advertising content is added to the video stream viewed by recipients 109. A database 105 with advertising content stored therein is linked to the media server 111. The JoinMe application selects appropriate advertising content in accordance with the identifying information 401 provided by user 101. The advertising content is then transmitted to media server 111, so that viewers see the advertising simultaneously with the live video, before the feed starts, or interleaved therewith during breaks or lulls. The advertising may include text or still or video images, or may be static banners or images with or without links to other content. Advertising content may be sent based on a variety of factors, such as for example the identity of the sender or recipient based on information contained in, for example, user database 500. The advertising content may also be based on the context of messages sent, e.g. "I'm at a Coldplay concert," with the words "Coldplay" or "concert" being used to determine advertising content. In addition, if the sender or recipient has a location detecting device (e.g. GPS enabled telephone or PDA) the location could be used as a factor in sending the advertising.

Although the servers 107, 110, 111 have been described as different servers to point out their different functions, it will be appreciated that they need not be separate devices. In addition, differing functional elements described herein may be implemented as software, firmware, and/or hardware, or may be implemented in multiple, single, or distributed components, either at a device level, server level, or network level or combinations thereof.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

I claim:

1. A method comprising:
   enabling transmission, via a network, of at least one invitation from a viewer device relating to a live video stream of an event to at least one receiving device associated with at least one selected individual;
   receiving an acceptance of the at least one invitation from the receiving device, via the network, at at least one computing device, the acceptance comprising a signal representing rendering capabilities of the receiving device;
   in response to the acceptance of the at least one invitation, processing the acceptance of the at least one invitation using the at least one computing device, said processing comprising determining rendering capability of the receiving device in accordance with said received signal for rendering media and enabling transmission by the viewer device, via a network, of a live video of the event at a bandwidth and in a format based on said rendering capability determination;
   receiving the live video, via the network, at the at least one computing device;
   processing the live video relating to the event received from said viewer device using the at least one computing device according to the bandwidth and format; and
   outputting a video stream comprising the received and processed live video, via the network, to said receiving device of said selected individual, in accordance with the acceptance and said rendering determination.

2. The method according to claim 1, wherein said processing of the live video further comprises caching the live video.

3. The method according to claim 1, further comprising storing the live video in a streaming database.

4. The method according to claim 1, wherein said processing of the acceptance further comprises detecting additional capabilities of the receiving device of the individual, and said outputting is performed in accordance with said additional capabilities.

5. The method according to claim 1, wherein the invitation includes information regarding one of a viewer and the event.

6. The method according to claim 1, wherein said outputting is performed in real time.

7. The method according to claim 2, wherein said outputting is performed by transmitting a cached video stream.

8. The method according to claim 1, wherein said outputting further comprises adding advertising content to the video stream.

9. The method according to claim 8, further comprising retrieving the advertising content from an advertising database.

10. The method according to claim 8, wherein the advertising content is selected in accordance with information regarding the event.

11. The method according to claim 8, wherein the advertising content is selected in accordance with information regarding a viewer or the selected individual.

12. The method according to claim 11, further comprising retrieving said information regarding the viewer or the selected individual from a user database.

13. A system comprising:
   a first server for enabling transmission of at least one invitation from a viewer device to at least one receiving device of at least one selected individual and for processing an acceptance of the at least one invitation from the receiving device comprising a signal representing rendering capabilities of the receiving device, the first server is further configured to determine rendering capability of the receiving device in accordance with said received signal and enable the viewer device to transmit a live video of an event upon processing of said acceptance of the at least one invitation at a bandwidth and in a format based on the rendering capability determination;
   a second server for processing a live video of the event according to the bandwidth and the format; and
   a third server for outputting a video stream comprising the processed live video to the receiving device of the selected individual in accordance with the acceptance.

14. The system according to claim 13, wherein said second server caches the live video.

15. The system according to claim 13, further comprising a streaming database, and wherein said second server is configured to store the live video on the streaming database.

16. The system according to claim 13, wherein said first server is configured to detect additional capabilities of the receiving device of the selected individual and to transmit information regarding said additional capabilities to said third server.

17. The system according to claim 16, wherein said third server performs said outputting in accordance with said additional capabilities.

18. The system according to claim 13, wherein the invitation includes information regarding the event.

19. The system according to claim 13, wherein said third server performs said outputting in real time.

20. The system according to claim 14, wherein said third server performs said outputting by transmitting a cached video stream.

21. The system according to claim 13, wherein said third server is configured to add advertising content to the video stream.

22. The system according to claim 21, further comprising an advertising database including the advertising content.

23. The system according to claim 21, wherein said third server is configured to select the advertising content in accordance with information regarding the event.

24. The system according to claim 21, wherein the advertising content is selected in accordance with information regarding the viewer or the selected individual.

25. The system according to claim 24, further comprising a user database including said information regarding the viewer or the selected individual.

26. The system according to claim 13, wherein said second server accepts the live video from the viewer over a wireless data network.

27. A non-transitory computer-readable storage medium tangibly encoded with a computer program product comprising instructions, that when executed by a processor of a computing device, performs a method comprising:
enabling transmission, via a network, of at least one invitation from a viewer device relating to a live video stream of an event to at least one selected individual;
receiving from the receiving device an acceptance of the at least one invitation, via the network, at at least one computing device, the acceptance comprising a signal representing rendering capabilities of the receiving device;
in response to the acceptance of the at least one invitation, processing the acceptance of the at least one invitation using the at least one computing device, said processing comprising determining rendering capability of the receiving device in accordance with said received signal for rendering media and enabling transmission, by the viewer device via a network, of a live video of the event at a bandwidth and in a format based on said rendering capability determination;
receiving the live video, via the network, at the at least one computing device;
processing the live video relating to the event received from said viewer device using the at least one computing device according to the bandwidth and the format; and
outputting a video stream comprising the processed live video, via the network, to said receiving device of said selected individual, in accordance with the acceptance and said rendering determination.

28. The non-transitory computer-readable storage medium according to claim 27, further comprising instructions for caching the live video.

29. The non-transitory computer-readable storage medium according to claim 27, further comprising instructions for storing the live video in a streaming database.

30. The non-transitory computer-readable storage medium according to claim 27, further comprising instructions for adding advertising content to the outputted video stream.

* * * * *